Aug. 18, 1959     S. FRIEDMAN     2,900,022

FISH FEEDING DEVICE

Filed Aug. 17, 1955

INVENTOR.
SOL FRIEDMAN
BY
ATTORNEY

2,900,022
FISH FEEDING DEVICE

Sol Friedman, Bronx, N.Y.

Application August 17, 1955, Serial No. 528,961

2 Claims. (Cl. 161—10)

This invention relates to a device for the feeding of fish, and more specifically to tropical fish, while the owner is absent.

In the raising of tropical fish it often becomes necessary for the owner to be away from the aquarium for an extended period of time. During this time it is necessary to feed the fish in order to keep them alive. Previously known devices have employed highly complicated timing structures and electrical circuits for achieving this purpose. The failure of the power supplies for any of the complicated devices has resulted in loss of expensive fish.

Accordingly, it is an object of the present invention to provide a fish feeding device which will remain in operation and provide a continuing and metered source of food for an extended period of time.

Another object of the present invention is to provide an inexpensive fish feeding device.

A further object of the present invention is to provide a device which may be adjusted with ease as to the rate of feeding and amount of food dispensed over each interval.

A feature of the present invention is the use of an evaporating fluid for timing the feeding cycle.

A further feature of the present invention is its use of a rotatable dispensing platform operated by an arm adjacent thereto.

Another feature of the present invention is its almost fool-proof construction.

The invention consists of the construction, combination and arrangement of parts, as herein illustrated, described and claimed.

In the accompanying drawing, forming a part hereof, is illustrated one form of embodiment of the invention, and in which.

Figure 1:
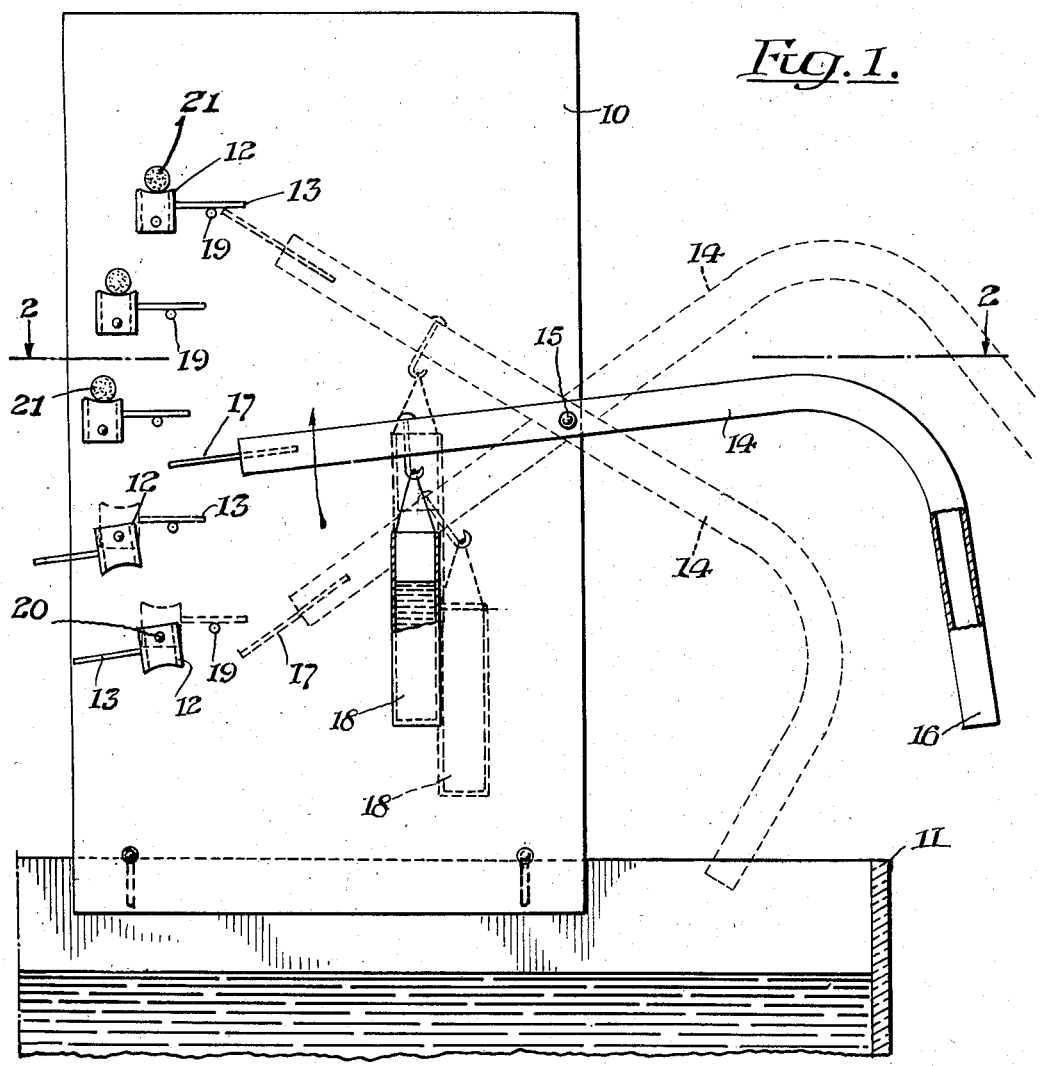
Figure 1 is a view in side elevation of a complete embodiment of the present invention with certain elements shown in dashed lines to indicate their position in various stages of operation of the feeding device.
Figure 2:
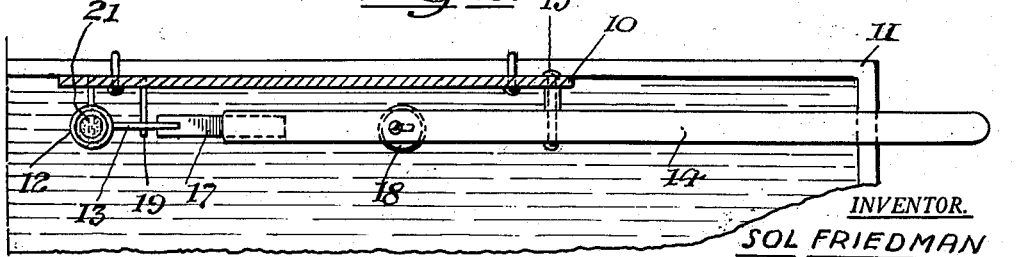
Figure 2 is a sectional view of the fish feeding device shown in Figure 1, taken on line 2—2.

Referring to the drawing, 10 indicates a board or support which is mounted vertically upon the edge of a tank or aquarium 11. A plurality of fish food containers 12 are pivotally mounted on the board 10 so as to overlie the water in the tank. Each food container 12 is provided with an outwardly disposed trip arm 13, which arm, overlies the path of an actuating arm 14. The actuating arm 14 is pivotally secured to the board 10 as indicated at 15. One end of the arm 14 is provided with a counterweight 16. The opposite end of the arm 14 has carried therein an extending trip lever 17. As the arm 14 rotates about its pivot point 15 the trip arm 17 swings through an arc which will bring it into contact with each of the small trip arms 13 which extend from the feeding container 12. A small vial 18 is hung from the pivoted arm 14 between the trip lever and the pivot point 15. The vial 18 may be filled with any suitable fluid such as water, alcohol, a mixture of alcohol and water or the like. The nature of the fluid may be varied to regulate the speed of evaporation and control the feeding interval time. In operating the above device the vial 18 is filled with the proper amount of fluid necessary to raise the counter weight 16 to the upper position shown in dashed lines in Figure 1. The feeding containers 12 are turned upon the pivot points 20 so that their laterally extending arms 13 rest upon the stops 19. A pellet of fish food, generally indicated at 21, may be placed upon each of the upturned containers 12 when the device is arranged for operation.

As the liquid in the vial 18 evaporates, the counterweight 16 causes the arm 14 to rotate slowly in a clockwise direction. As the arm 14 rotates the trip lever 17 comes in contact with each of the trip arms 13 thereby causing the feeding containers 12 to spin around the pivot point 20 in a counter-clockwise direction and drop the food pellet 21 into the tank 11. By employing the proper fluids and by disposing the food upon the carriers 12 it will be possible to have the apparatus function over the period of an entire week supplying the fish with food at intervals and in metered amounts.

More rapidly evaporating fluids will speed up the time of feeding and slower evaporating fluids will lengthen the time of feeding. In addition, the pellets 21 may be made in varying sizes. It is also within the purview of the present invention to make the food containers in the shape of cups and have the fish food placed within said cups for dispensing in the above disclosed manner.

Having thus fully described the invention, what is claimed as new and desired to be secured by Letters Patent of the United States, is:

1. A fish feeding device for attachment to the edge of an aquarium comprising, a vertically disposed support member, a plurality of pivotally mounted fishfood receptacles disposed along an arcuate path upon said support, an actuating arm pivotally carried upon the support in a state of imbalance, a vial open at its top to the atmosphere secured to the said arm and adapted to receive a fluid therein having a selected evaporation rate and trip means engageable by said arm and food receptacles whereby gradual rotary motion of the arm, due to evaporation of the liquid in the vial, will rotate the receptacles and release the food.

2. A fish feeding device for attachment to the edge of an aquarium comprising, a vertically disposed support member, a plurality of pivotally mounted fishfood receptacles disposed along an arcuate path upon said support, a laterally extending trip arm on each receptacle, an actuating arm pivotally carried upon the support, a weight on said actuating arm disposed so as to place said arm in a state of imbalance, a vial open at its top to the atmosphere secured to the said arm and adapted to receive a fluid therein having a selected evaporation rate and trip means engageable by said arm and the trip arm of the food receptacles whereby gradual rotary motion of the arm, due to evaporation of the liquid in the vial, will rotate the receptacles and release the food.

References Cited in the file of this patent

UNITED STATES PATENTS

| 1,029,623 | Niemann et al. | June 18, 1912 |
| 1,112,918 | Kuxmann et al. | Oct. 6, 1914 |
| 1,822,901 | Lacy Mulhall | Sept. 15, 1931 |
| 2,004,194 | Lacy Mulhall | June 11, 1935 |

FOREIGN PATENTS

| 198,805 | Great Britain | June 14, 1923 |
| 310,646 | Great Britain | May 2, 1929 |